US012792155B2

(12) United States Patent
Xu et al.

(10) Patent No.: US 12,792,155 B2
(45) Date of Patent: Nov. 10, 2026

(54) ACTIVATING CROSS-DEVICE INTERACTION WITH POINTING GESTURE RECOGNITION

(71) Applicant: HUAWEI TECHNOLOGIES CO., LTD., Shenzhen (CN)

(72) Inventors: Qiang Xu, Thornhill (CA); Jiayu Long, Shenzhen (CN); Zhe Liu, Richmond Hill (CA); Wei Li, Richmond Hill (CA); Tong Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/966,332

(22) Filed: Oct. 14, 2022

(65) Prior Publication Data

US 2023/0038499 A1 Feb. 9, 2023

Related U.S. Application Data

(63) Continuation of application No. PCT/CN2020/107405, filed on Aug. 6, 2020.

(51) Int. Cl.
*G06F 3/048* (2013.01)
*G06F 3/01* (2006.01)
(Continued)

(52) U.S. Cl.
CPC ............ *G06F 3/017* (2013.01); *G06F 3/0346* (2013.01); *G06F 3/0488* (2013.01)

(58) Field of Classification Search
CPC ...... G06F 3/017; G06F 3/0346; G06F 3/0488; H04W 4/80; G06V 40/28
See application file for complete search history.

(56) References Cited

U.S. PATENT DOCUMENTS 10,572,012 B2 2/2020 Gupta et al.
10,586,434 B1 3/2020 Siminoff
(Continued)

FOREIGN PATENT DOCUMENTS

CN 101344816 A 1/2009
CN 105528057 A 4/2016
(Continued)

OTHER PUBLICATIONS

J. Yang, Y. Li and M. Xie, "MotionAuth: Motion-based authentication for wrist worn smart devices," 2015 IEEE International Conference on Pervasive Computing and Communication Workshops (PerCom Workshops), 2015, pp. 550-555, doi: 10.1109/PERCOMW.2015.7134097.

*Primary Examiner* — Aleksey Olshannikov

(57) ABSTRACT

A method and handheld device for remotely interacting with a second device. The method and apparatus identify the second device from a plurality of devices based on the gestures of the user. As the user gestures, movement sensors sensing the motion of these gestures can generate signals that can be processed by rule-based and/or learning based methods. The result of processing these signals can be used to identify the second device. In order to improve performance, the user can be prompted to confirm the identified second device is the device the user wants to remotely control. The results of processing these signals can also be used so that the user can remotely interact with the second device.

22 Claims, 11 Drawing Sheets

(51) Int. Cl.
*G06F 3/0346* (2013.01)
*G06F 3/0488* (2022.01)

(56) References Cited

U.S. PATENT DOCUMENTS

| | | | | |
|---|---|---|---|---|
| 11,410,541 | B1 * | 8/2022 | Chung | G01S 5/0284 |
| 2009/0096746 | A1 | 4/2009 | Kruse et al. | |
| 2011/0312311 | A1 | 12/2011 | Abifaker et al. | |
| 2014/0176436 | A1 | 6/2014 | Raffa et al. | |
| 2015/0346834 | A1 | 12/2015 | Martinez Fernandez et al. | |
| 2015/0373065 | A1 * | 12/2015 | Holmquist | H04L 65/1069 715/753 |
| 2017/0083102 | A1 | 3/2017 | Dow et al. | |
| 2017/0228935 | A1 | 8/2017 | Foster et al. | |
| 2019/0239060 | A1 | 8/2019 | Yoon et al. | |
| 2020/0104038 | A1 * | 4/2020 | Kamath | G06F 3/04883 |
| 2020/0301512 | A1 * | 9/2020 | Davies | G06F 3/017 |
| 2020/0356221 | A1 * | 11/2020 | Behzadi | H04L 67/04 |
| 2023/0296958 | A1 * | 9/2023 | Ataei | G02F 1/1392 349/202 |

FOREIGN PATENT DOCUMENTS

| | | | |
|---|---|---|---|
| CN | 103826007 | B | 8/2016 |
| CN | 108604129 | A | 9/2018 |
| CN | 109074819 | A | 12/2018 |
| JP | 2013506385 | A | 2/2013 |
| JP | 2013532338 | A | 8/2013 |
| JP | 2016504652 | A | 2/2016 |
| JP | 2017516242 | A | 6/2017 |
| JP | 2018045313 | A | 3/2018 |
| JP | 2019510296 | | 4/2019 |
| WO | 2017218363 | A1 | 12/2017 |
| WO | 2018023042 | A1 | 2/2018 |

* cited by examiner

ACTIVATING CROSS-DEVICE INTERACTION WITH POINTING GESTURE RECOGNITION

CROSS-REFERENCE TO RELATED APPLICATIONS

The present application is a continuation of International Application No. PCT/CN2020/107405 filed Aug. 6, 2020 and entitled “ACTIVATING CROSS-DEVICE INTERACTION WITH POINTING GESTURE RECOGNITION”, the contents of which are incorporated herein in their entirety.

FIELD OF THE INVENTION

The present invention pertains to remotely interacting with electronic devices, and in particular to methods and apparatus used to recognize gestures of a user and to then apply these gestures to remotely interact with electronic devices.

BACKGROUND

With more smart devices entering the consumer market, consumer demand for the ability to remotely control these smart devices is increasing.

As handheld electronic devices (cellular telephones) become more popular and powerful, demand for the ability to remotely control smart devices using the consumer's handheld electronic device is increasing. However, products that are currently aimed at addressing this demand commonly do not select the smart device that the user wants to control. As a result, there is a need for products that to improve the experience of the user by selecting the smart device the user wants to remotely control every time.

This background information is provided to reveal information believed by the applicant to be of possible relevance to the present invention. No admission is necessarily intended, nor should be construed, that any of the preceding information constitutes prior art against the present invention.

SUMMARY

Embodiments of the invention provide a system for implementing a pointing gesture recognition system (PGRS). Embodiments also provide methods to implement an architecture to provide a PGRS that enables a user to remotely control one or more second devices through recognition of the gestures of the user.

In accordance with embodiments of the present invention, there is provided a method, by a handheld electronic device, for remotely interacting with a second device. The method includes sensing motion of the handheld device based on signals generated by one or more movement sensors of the handheld electronic device. This method also includes recognizing that the sensed motion is a motion-based gesture comprising movement of the handheld electronic device. This method further includes identifying the second device based on one or both of: the signals and further signals. The further signals are from: the one or more movement sensors; one or more other components of the handheld device; or a combination thereof. The device orientation (which may be determined based on the movement sensor signals, the further signals, or both) and these further signals are indicative of a direction in which the handheld electronic device is pointing at an end of the motion-based gesture. After a predetermined condition is met and the second device is identified, the method will initiate a user interaction for remotely interacting with the second device, where the predetermined condition is at least partially met when the recognized motion-based gesture is a predetermined motion-based gesture for interacting with the second device.

A technical benefit of such embodiments is that user interaction is only initiated once a predetermined motion-based gesture is performed. This inhibits the handheld electronic device from incorrectly identifying that the user wishes to interact with the second device, which would negatively impact user experience and unnecessarily consume battery or processing resources, for example. Furthermore, the motion-based gesture is incorporated with the identification of the second device in that the second device is identified based on pointing, which can be integrated with the motion-based gesture. This combination allows both the recognition of the motion-based gesture and the second device identification to be integrated together.

In some embodiments, the predetermined condition further comprises recognizing a confirmation input from the user. A technical benefit of such embodiments is that user interaction is only initiated once the predetermined motion-based gesture and the confirmation input are performed. This further inhibits the handheld electronic device from incorrectly identifying that the user wishes to interact with the second device based on a spurious recognition of movements corresponding to the predetermined motion-based gesture.

In further embodiments, recognizing the confirmation input comprises recognizing, using the one or more movement sensors, that the handheld electronic device is held in position following said predetermined motion-based gesture without further motion for a predetermined amount of time. A technical benefit of this embodiment is that the confirmation input is automatically performed by pointing at the device without further user interaction with the handheld device, which improves user experience.

In some further embodiments, recognizing that the motion-based gesture is the predetermined motion-based gesture comprises recognizing signals, generated by the one or more movement sensors, which are indicative of movement of the handheld electronic device from a first position to a second position in an upward arcing motion. The first position corresponds to the handheld electronic device being proximate to a hip of the user and pointing downward, and the second position corresponds to the handheld electronic device being held at the end of a straightened arm and pointing toward the second device.

In other further embodiments, recognizing that the motion-based gesture is the predetermined motion-based gesture comprises recognizing signals, generated by the one or more movement sensors, which are indicative of movement of the handheld electronic device from a first position to a second position in a linear motion. In such embodiments, the first position corresponds to the handheld electronic device being held by the user with bent arm in front of a body of the user, and the second position corresponds to the handheld electronic device being held at the end of a straightened arm and pointing toward the second device.

In some embodiments, identifying the second device is performed after determining that the sensed motion of the handheld device has ceased. A technical benefit of this embodiment is that the second device can be more reliably identified and other devices unintentionally pointed to during the motion-based gesture are inhibited from being identified as the second device.

In some embodiments, the one or more movement sensors comprise one or more of: an accelerometer, a magnetometer, a proximity sensor, a gyroscope, an ambient light sensor, a camera, a microphone, a radiofrequency receiver; a near-field communication device; and a temperature sensor. A technical benefit of such embodiments is that a motion-based gesture can be recognized by sensors that directly respond to motion, by sensors that directly respond to parameters (e.g. body proximity, radiofrequency signals, sound or temperature) that are correlated indirectly with motion or position, or a combination thereof. This provides for a variety of input that can be processed to obtain motion-based or positional information.

In some embodiments, the one or more other components of the handheld device are configured to detect location of said one or more other electronic devices based at least in part on an angle of arrival measurement of signals emitted by each of said one or more other electronic devices. A technical benefit of this embodiment is that signals, such as radiofrequency signals, can be used to locate the second device. An antenna array system can be thus be leveraged, for example, to perform physical positioning.

In some embodiments, after the predetermined condition is met and the second device is identified, an icon indicative of the second device is displayed on the handheld electronic device. Position of the icon on the display is varied according to one or both of: an angle between a pointing direction of the handheld electronic device and a direction of the second device relative to the handheld electronic device; and a measurement of likelihood that the handheld device is being pointed toward the second device. A technical benefit of this embodiment is that it provides a visual correlation between the user actions and the device response, which can be used in a user-involved feedback loop to facilitate the second device selection process.

According to other embodiments, there is provided a handheld electronic device configured to perform operations commensurate with the above-described method. The device may include one or more movement sensors configured to generate signals indicative of motion of the handheld device; and processing electronics configured to implement such operations.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
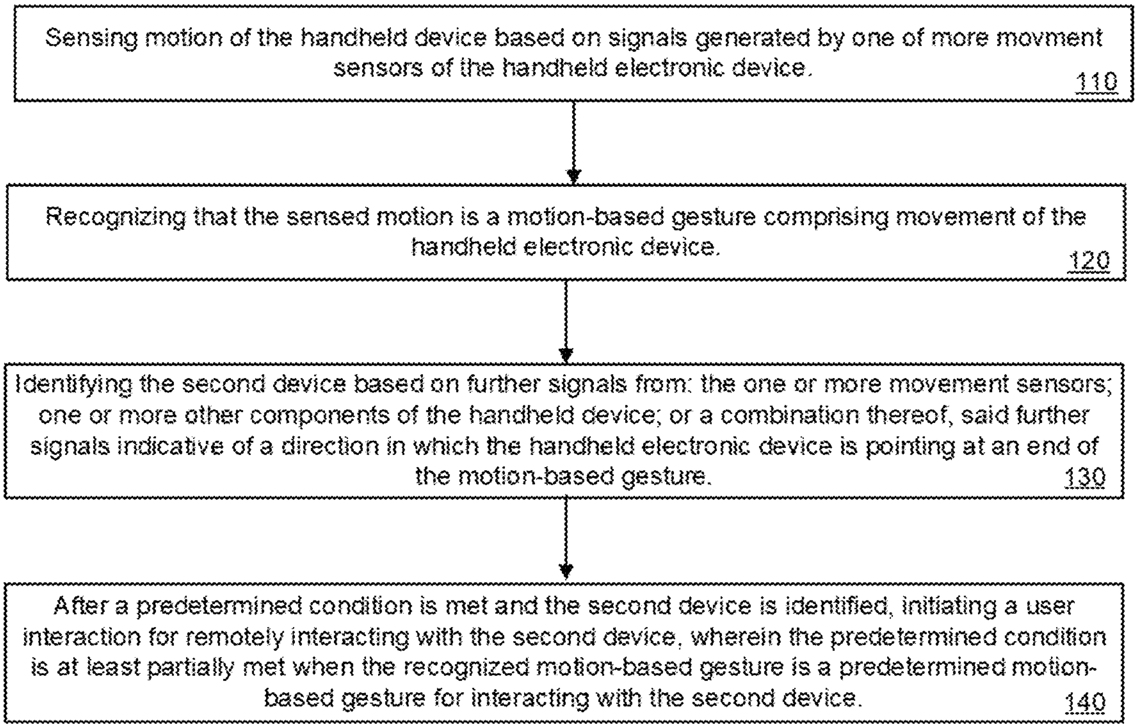
FIG. 1 illustrates a method provided according to an embodiment of the present disclosure.

Embodiments of the invention relate to provide methods, handheld electronic device, and system for pointing gesture recognition (PGR). A handheld electronic device is used to remotely interact with a second electronic device. Non-limiting examples of a handheld electronic device can include a smartphone, a handheld remote control, a smart ring, a smart band, and a smart watch. Non-limiting examples of a second electronic device can include smart televisions, tablets, smart glasses, smart watches, smart phones, personal computers, smart LEDs, robots such as robotic vacuums, speakers, and other home appliances.

According to embodiments of the present invention, a user of a handheld electronic device holding the handheld electronic device (or wearing the handheld electronic device on their wrist or on a finger) can remotely interact with a second electronic device by moving the handheld electronic device in one or more predefined motion-based gestures. These predefined motion-based gestures can include a user raising a hand that is holding the handheld electronic device from a position proximate their chest or a position below their waist to a position where the handheld electronic device is pointing towards a second electronic device the user wants to control. The handheld electronic device can sense motion of the handheld electronic device based on signals received from one or movement sensors of the handheld device when the user moves the handheld electronic device. The handheld electronic device can also recognize a motion-based gesture based on the sensed motion and generate a predetermined condition when the recognized motion-based gesture corresponds to a pre-defined motion-based gesture. The handheld electronic device can also identify a second electronic device based on signals from radio frequency sensors of the handheld electronic device after the pre-determined condition is met. The handheld electronic device can also include a processor that processes these predetermined conditions using methods described herein so the user can control the second electronic device using the handheld electronic device. Recognition of performance of the pre-defined motion-based gesture by the user of the handheld electronic device triggers the handheld electronic device to initiate interaction with the second electronic device to enable the user to control second electronic device using the handheld electronic device.

Interaction involves wireless communication between the handheld electronic device and the second device. The interaction can include the handheld electronic device transmitting messages that contain commands or queries which the second device responds to. Commands can cause the second device to perform an operation to which it is suited, such as changing a volume level or light level, performing a hardware or software action, or the like. Queries can cause the second device to send a response back to the handheld electronic device, such as a response containing information held by the second device and requested in the query. The interaction can be performed with or without input from the user.

FIG. 1 illustrates in an embodiment, a method 100 used by the handheld electronic device for remotely interacting with a second device. Method 100, as well as other methods described herein, may be carried out by routines and subroutines of a pointing gesture recognition system (PGRS) 200 of handheld electronic device 210. PGRS 200 may comprise software (e.g. a computer program) that includes machine-readable instructions that can be executed by a processor 910 (see FIG. 9) of handheld electronic device 210. PGRS may additionally or alternatively comprise dedicated electronics which may in some embodiments include hardware associated firmware. Coding of the PGRS 200 is well within the scope of a person of ordinary skill in the art having regard to the present disclosure. Method 100 may include additional or fewer operations than shown and described, and the operations may be performed in a different order. Computer-readable instructions of PGRS 200 executable by processor 910 of handheld electronic device 210 may be stored in a non-transitory computer-readable medium.

Method 100 begins at operation 110. At operation 110, the method comprises sensing motion of the handheld device based on signals generated by one or more movement sensors of the handheld electronic device 110. Method 100 then proceeds to operation 120.

At operation 120, method 100 recognizes that the sensed motion is a motion-based gesture based on signals received from one or more movement sensors of the handheld electronic device 110 during movement of the handheld electronic device 120. Method 100 then proceeds to operation 130.

Figure 4:
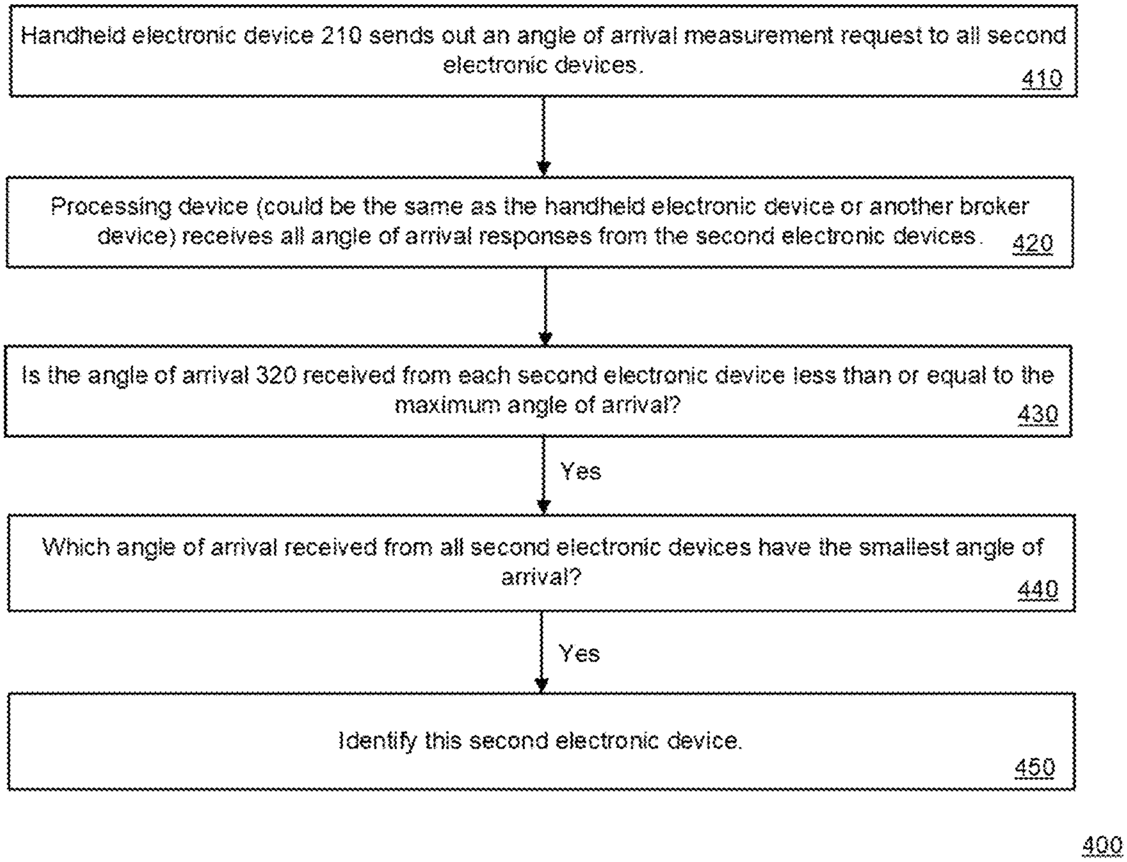
FIG. 4 illustrates an example angle of arrival measurement operation, according to an embodiment of the present disclosure.

At operation 130, method 110 identifies the second device based on further signals from: the one or more movement sensors; one or more other components of the handheld device; or a combination thereof. Such further signals are indicative of a direction in which the handheld electronic device is pointing at an end of the motion-based gesture. The motion-based gesture thus acts as a trigger for initiating interaction with the second electronic device, and also provides a means by which the user can point toward the second device so that the second device can be recognized, and the proper application for interacting with the second device can be launched. Operation 130 may be performed using angle of arrival measurements as illustrated in FIG. 4. Method 100 then proceeds to operation 140.

At operation 140, method 110, after a predetermined condition is met and the second device is identified, initiates a user interaction for remotely interacting with the second device, wherein the predetermined condition is at least partially met when the recognized motion-based gesture is a predetermined motion-based gesture for interacting with the second device 140.

Although in method 100, operations 110, 120, 130 and 140 are performed in sequence, the operation of identifying the second device may be performed partially or fully in parallel with the operations of recognizing motion-based gestures and determining that a predetermined condition is met. Performing the operations in the illustrated sequence allows for the device to be identified in particular at an end of the motion-based gesture, which may allow a user to use the same gesture for both identifying the second device and indicating that an interaction with the second device is desired.

Figure 2:
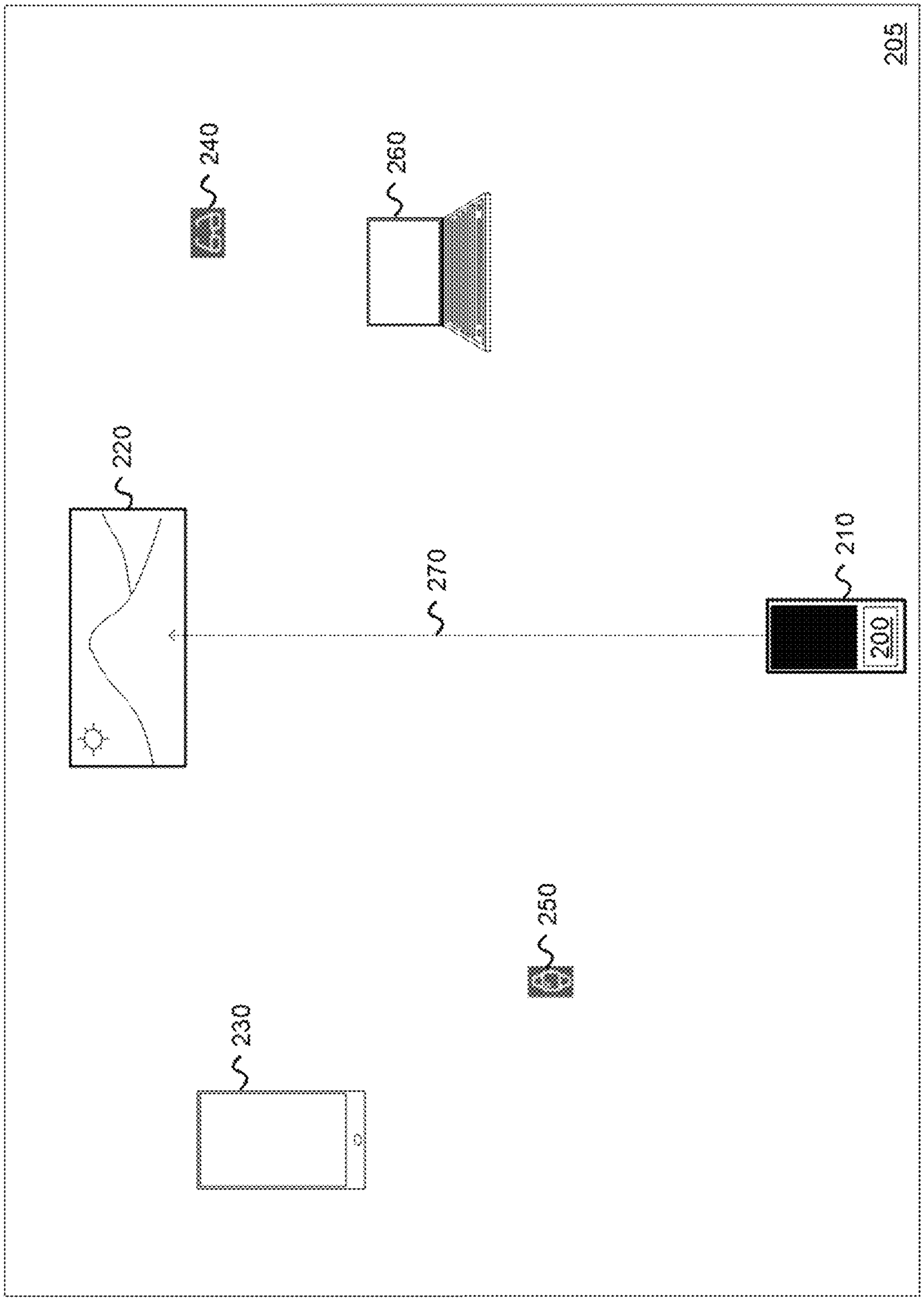
FIG. 2 illustrates selecting one of several electronic devices, according to an embodiment of the present disclosure.

FIG. 2 illustrates an example of a handheld electronic device 210 and several potential second devices and the roles they play, according to an embodiment of the present disclosure. As shown in FIG. 2, the user of handheld device 210 can control multiple second devices (e.g. one at a time via selection) including a smart television 220, tablet 230, smart glasses 240, smart watch 250, and a personal computer 260. The handheld device 210 and second devices are part of an operating environment 205. As illustrated by FIG. 2, the user of handheld device 200 can control smart television 220 by performing a pre-defined motion-based gesture that terminates with the user pointing handheld electronic device 210 at the smart television 220. Pointing the handheld electronic device 210 at the smart television 220 may cause a PGRS 200 of handheld device 210 to project a (real, virtual or conceptual) ray 270 towards smart television 220 and for PGRS 200 to identify smart television 220 as the second device. The ray 270 is known to those skilled in the art of ray tracing as the pointing direction.

Figure 3A:
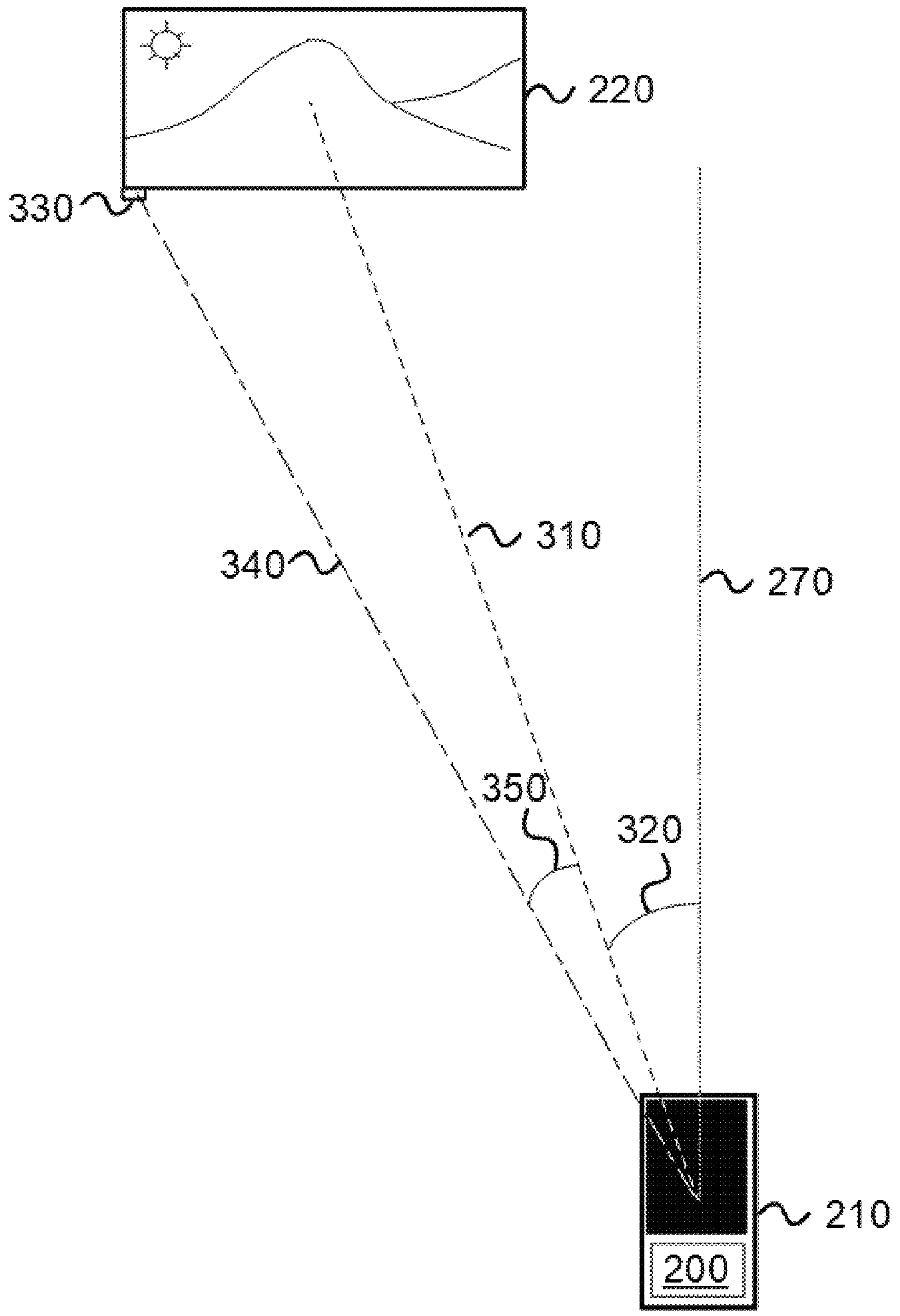
FIG. 3A illustrates an angle of arrival of signals from a selectable second electronic device, according to an embodiment of the present disclosure.

FIG. 3A illustrates an example of handheld electronic device 210 identifying smart television 220 when ray 270, projected by handheld electronic device 210, does not terminate at smart television 220. In some embodiments, PGRS 200 of handheld device 210 performs pointing-based selection based on device-to-device angle of arrival measurements. Using pointing-based selection based angle of arrival measurements, PGRS 200 of handheld device 210 is able to identify a second device that is not directly pointed to by handheld electronic device 210. As illustrated by FIG. 3A, PGRS 200 of handheld device 210 identifies smart television 220 based on pointing-based selection using device-to-device angle of arrival 320. Angle of arrival 320 is the angle between ray 270 and a second ray, ray 310. Ray 270 is projected along the long axis of handheld electronic device 210 and extends from the center of handheld electronic device 210. Ray 310 is projected from the center of handheld electronic device 210 to the center of the second device. Handheld device 210 includes a radio frequency (RF) sensor 920 (see FIG. 9) that includes a RF transmitter, an RF receiver, and one or more RF antennas. Similarly, the second electronic device includes an RF sensor that includes a RF transmitter, an RF receiver, and one or more RF antennas. The RF sensor 920 and the RF sensor of the second electronic device can be any RF sensor based on one of several known technological standards including IEEE 802.11 (known to those skilled in the art as WiFi®), Bluetooth® low energy (known to those skilled in the art as BLE), Ultra-wideband (known to those skilled in the art as UWB), and Ultrasonic specify required angle of arrival values. In some embodiments of this invention, angle of arrival 320 is compliant with UWB, WiFi®, BLE, and Ultrasonic requirements.

Device-to-device angle of arrival 320 can be measured using several methods. One method includes measuring the propagation direction of radio-frequency waves that are incident on an antenna of a RF sensor. A second method is to measure the phase of radio-frequency waves that are incident on a plurality of antenna array elements of the RF sensor. Angle of arrival can be determined in this second method by computing the difference between the measured phases of the incident radio-frequency waves.

In some embodiments, in order to facilitate angle of arrival measurements, the handheld electronic device may transmit a request to the second device, to transmit appropriate RF signals. The RF signals can then be received, for example using an antenna array of the handheld electronic device, and processed by the handheld electronic device to determine the angle or arrival 320. Additionally or alternatively, the handheld electronic device may transmit RF signals as well as a request for angle of arrival measurements the second device. The second device may then receive the RF signals from the handheld electronic device, for example using an antenna array of the second device, and process the RF signals to determine an angle of arrival of the handheld electronic device from the perspective of the second device. The result can be transmitted back to the handheld electronic device and used thereby.

In some embodiments, UWB, WiFi, BLE, and Ultrasonic technical standards require that second ray 310 is projected to the center of the second device. However, if the second device is large, the detector of the second device 330 that is used to measure angle of arrival may be a significant distance from the center of the second device. This significant distance can result, and in effect move the second ray 310 to ray 340. Ray 340 has an associated angle 350. Angle 350 adds an offset to the angle of arrival 320. The result of ray 340 and offset angle 350 is that PGRS 200 is able to detect the pointing direction that is not projected to the center of the second device.

Figure 3B:
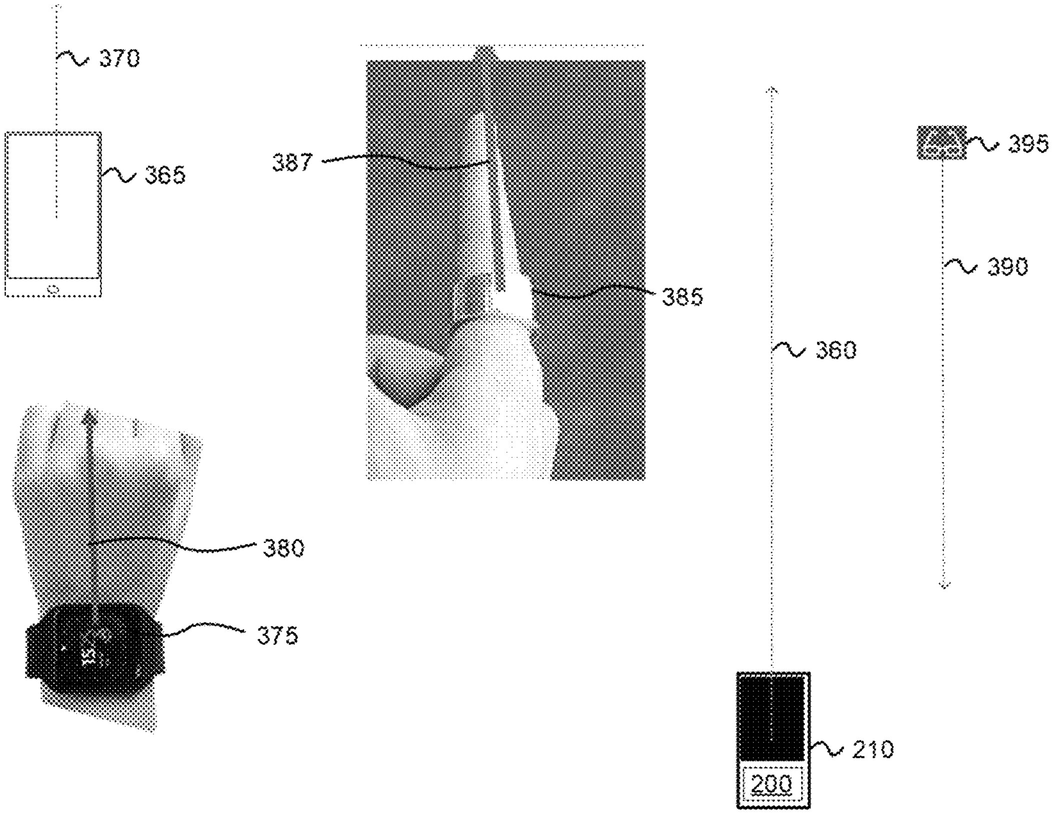
FIG. 3B illustrates pointing direction, according to an embodiment of the present disclosure.

FIG. 3B illustrates examples of pointing directions, also referred to herein as device orientations, of a tablet 365, smart watch 375, smart ring 385, handheld electronic device 210 and smart glasses 395, respectively. For purposes of illustration, the orientation of each device is defined by a ray 360, 370, 380, 387 and 390, projected along the long axis of its respective device. The ray in each case extends from or passes through the centre of the device. However, in other embodiments, the rays may be oriented differently. For purposes of the present discussion, a pointing direction or device orientation may be equivalent to the direction of the ray. According to various embodiments, the second electronic device can be selected based on device orientation (pointing direction) of the handheld electronic device. This orientation can be determined based on signals from components of the device. For example, angle of arrival measurements as described above can be used to determine device orientation (pointing direction). In some embodiments, components such as gyroscopes and magnetometers may be used to determined absolute device orientation (pointing direction). Accelerometers along with deadreckoning processing can also be used to determine or support determining device orientation (pointing direction).

FIG. 4 illustrates an example flow-chart of operations performed by the handheld electronic device for identifying the second electronic device. The operations of FIG. 4 can be sub operations of operation 130 of method 100 performed by handheld device 210. Method 400 uses pointing-based selection based on angle of arrival to identify a second device, where handheld electronic device 210 sends an angle of arrival measurement request to all second devices 410. The second devices determine their angle of arrival using ray 270 and second ray 310 (or in some embodiments second ray 340). The handheld electronic device then receives each angle of arrival response from all of the second devices 420. It is noted that, here and elsewhere, processing operations can potentially be offloaded to other devices, such as cloud computing devices, which timely return the results to the handheld electronic device for use. In the situation where handheld electronic device 210 can communicate with a plurality of second devices, the handheld electronic device uses the angle of arrival received from all the second devices to identify 450 which second device can communicate with handheld electronic device 210. This identification 450 may be facilitated by two actions, namely 430 and 440. The first action 430 is a comparison of the angle of arrival received from each second device. The maximum angle of arrival is a predefined parameter that may be device dependent. Angle of arrival may also be dependent on the wireless technology being used, for example as specified by supported technical standards which can include WiFi, BLE, UWB, and Ultrasonic standards. The maximum angle of arrival may represent pointing error tolerance. The second action 440 is a determination of which second device has the smallest angle of arrival.

In some embodiments the predetermined condition further comprises recognizing a confirmation input from the user. To improve performance of PGRS 200 so that PGRS 200 selects the second device the user intended to select, once PGRS 200 has identified a second device, handheld electronic device 210 can vibrate to provide feedback to a user. This vibration can prompt the user to press a key or button of handheld electronic device 210 to confirm that the identified second device is the second device the user intended to select.

In some embodiments, recognizing the confirmation input comprises recognizing that a second predetermined motion-based gesture which moves the handheld electronic device 210. The second predetermined motion-based gesture is recognized based on a sensed motion of the handheld electronic device after the predetermined motion-based gesture has been recognized by the handheld device 210.

In some embodiments, recognizing the confirmation input comprises recognizing, based on signals received from the one or more movement sensors, that the handheld electronic device is rotated in place. As a non-limiting example, the user can twist their wrist of the hand that is holding handheld electronic device 210 when prompted by handheld electronic device 210 for a confirmation that the correct second device was selected.

In some embodiments, recognizing the confirmation input comprises recognizing, based on signals received from the one or more movement sensors, that the handheld electronic device is held in position following said predetermined motion-based gesture without further motion for a predetermined amount of time. A non-limiting example of this confirmation is to point handheld electronic device 210 toward the second device the user wants to control for one second. It should be appreciated that holding electronic device 210 as a confirmation is known to those skilled in the art as "hovering".

In some embodiments, recognizing the confirmation input comprises detecting presence of a signal indicative of pressing of a physical button of the handheld electronic device or a virtual button displayed on a touchscreen of the handheld electronic device. A non-limiting example of this confirmation is pressing the power button of handheld electronic device 210. Another non-limiting example of this confirmation is pressing a soft-key of the keyboard of handheld electronic device 210.

In some embodiments, the method further comprising, after recognizing that the motion-based gesture is a predetermined motion-based gesture, after the second device is identified, and prior to detecting the confirmation input, prompting the user to provide the confirmation input to confirm an intention to interact with the second device.

In some embodiments, the predetermined condition further comprises detecting presence of a signal indicative of pressing of a physical button of the handheld electronic device or a virtual button displayed on a touchscreen of the handheld electronic device.

In some embodiments, the predetermined condition comprises detecting presence of the signal indicative of pressing of the physical button or the virtual button at a beginning of the motion-based gesture.

In some embodiments, recognizing that the motion-based gesture is the predetermined motion-based gesture comprises recognizing signals, generated by the one or more movement sensors, indicative of movement of the handheld electronic device 210 from a first position to a second position in an upward arcing motion. The first position corresponds to the handheld electronic device being proximate to a hip of the user and pointing downward, and the second position corresponds to the handheld electronic device 210 being held at the end of a straightened arm and pointing toward the second device.

In some embodiments, recognizing that the motion-based gesture is the predetermined motion-based gesture comprises recognizing signals, generated by the one or more movement sensors, indicative of movement of the handheld electronic device from a first position to a second position in a linear motion. The first position corresponds to the handheld electronic device being held by the user with bent arm in front of a body of the user, and the second position corresponds to the handheld electronic device being held at the end of a straightened arm and pointing toward the second device.

Figure 5:
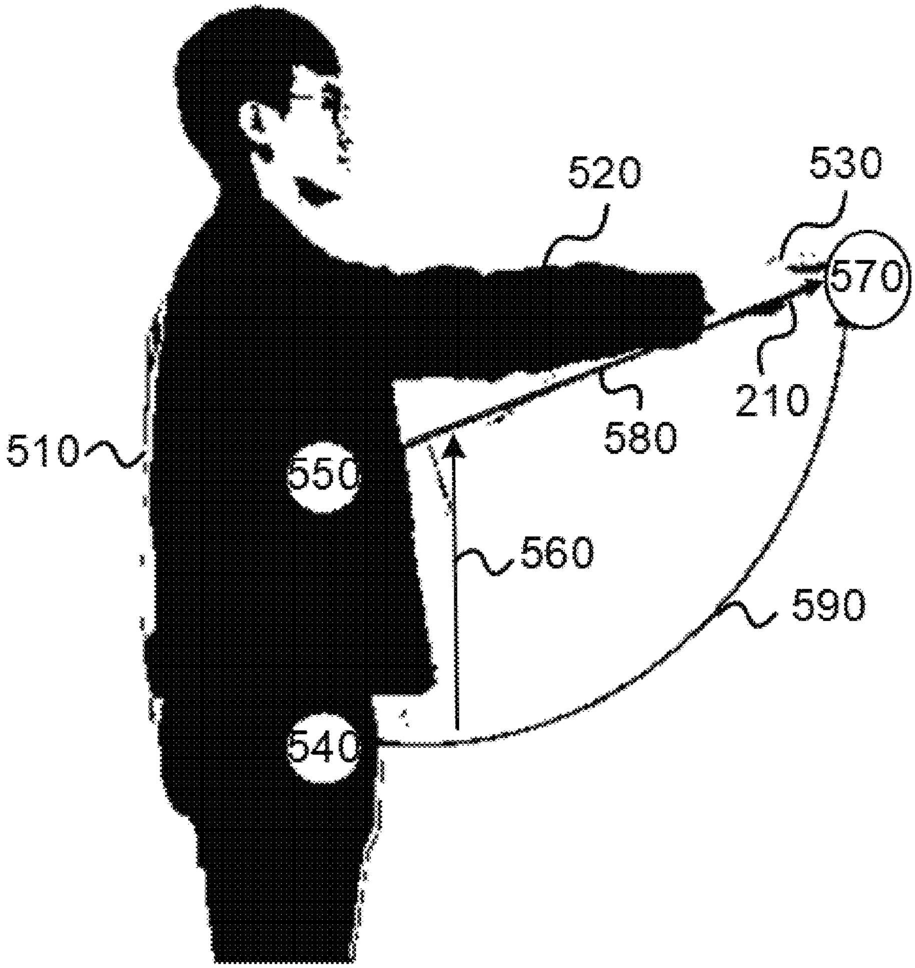
FIG. 5 illustrates potential gestures a user may use to remotely interact with electronic devices, according to an embodiment of the present disclosure.

FIG. 5 illustrates user 510 holding handheld electronic device 210 and moving said device according to three particular motion-based gestures usable by a user to remotely interact with the second device. These three motion-based gestures are included in the predetermined motion-based gestures that can be recognized by PGRS 200 of handheld device 210. It should also be appreciated that signals generated by the one or movement sensors of handheld device 210 can be processed by PGRS 200 of handheld device 210 and can be analyzed using models that can include a mannequin model and a machine learning model.

Analysis using a mannequin model can be performed by the PGRS 200 as follows. The signals can be processed using operations that categorize signals from movement sensors based on the types of motions that a human body is typically capable of performing. Signals from one or more sensors can thus be mapped to motions performed by a human body to facilitate gesture recognition by the PGRS 200. The signals can be instantaneous readings from movement sensors or samples taken from movement sensors over a time interval.

Analysis using a machine learned model can be performed by the PGRS 200 as follows. A machine learning model for recognizing motion-based gestures can be learned during a training phase by instructing the user to perform the predefined motion-based gestures and monitoring the resulting signals from the one or more movement sensors. The resulting signals can be used to generate a labeled dataset. The trained model can then be deployed in the PRGS 200 to recognize further instances of motion-based gestures based on new signals received from the one or more movement sensors. Further signals can then be processed by the machine learning model to determine when the gestures are performed, and the machine learning model can output an indication of same.

Motion-based gesture 560 is performed by user 510 when user 510 raises handheld electronic device 210, held by hand 530, from position 540 to position 550 by moving arm 520. It should be appreciated that handheld electronic device 210 is kept close to the body of user 510 as user 510 moves handheld device 210 for motion-based gesture 560. Motion-based gesture 560 can be sensed by handheld device 210 which senses motion of handheld device 210 as the user performs motion-based gesture 560 that includes sensing the displacement, rotation, and acceleration of handheld electronic device 210.

Motion-based gesture 580 occurs when user 510 extends handheld electronic device 210 from position 550 to position 570 using arm 520. It should be appreciated that handheld electronic device 210 is close to the body of user 510 when at position 550 and that this proximity to the body of user 510 decreases as handheld electronic device 210 is extended to position 570 for gesture 580. Motion-based gesture 580 can also be sensed by sensing motion that includes sensing the displacement, rotation, and acceleration of handheld electronic device 210 as said device is pointed at a second device.

Motion-based gesture 590 occurs when user 510 rotates arm 520 to move handheld electronic device 210 directly from position 540 to position 570. It should be appreciated that handheld electronic device 210 is close to the body of user 510 when at position 540 and that this proximity to the body of user 510 decreases as handheld electronic device 210 is extended to position 570 for gesture 590.

In some embodiments, recognizing that the motion-based gesture is the predetermined motion-based gesture comprises performing pattern recognition on the signals generated by the one or more movement sensors.

Embodiments of PGRS 200 can recognize motion-based gestures using rule-based operations, and learning-based operations, or a combination thereof. These operations can analyze signals generated by one or more movement sensors of handheld electronic device 210. The PGRS 200 can use an acceleration pattern, a rotation pattern, or a magnetic field magnitude pattern to recognize that a motion-based gesture is a predefined motion-based gesture. The PGRS 200 can use one or more of a variety of computational methods to recognize that a motion-based gesture is a predefined motion-based gesture. The computational methods can include performing similarity measurements that can include Euclidean distance, cosine distance, and using dynamic programming techniques that can include support vector machines (SVM), dynamic time warping (DTW), deep learning that can include auto encoder, long-short term memory (LSTM), and convolutional neural network (CNN).

In some embodiments, the handheld electronic device 210 includes a gesture recognizer that is configured to recognize a motion-based gesture performed by a user holding the handheld electronic device 210 (or wearing the handheld electronic device 210) based on signals received from movement sensors of the handheld device 210. The gesture recognition component may be implemented by a processor executing instructions stored in memory. In non-limiting embodiments, the gesture recognition component implements rules for recognizing a motion-based gesture based on signals from the movement sensors. In non-limiting embodiments, the gesture recognition component implements a machine-learned model receives signal from the movement sensor and outputs a predicted a motion-based gesture based on signals from the movement sensors. In non-limiting embodiments, the gesture recognition component implements templates that are used to recognize a motion-based gesture based on signals from the movement sensors as described in further detail below. The machine-learned model can be learned using a supervised learning algorithm (such as a deep neural network, a support vector machine (SVM), similarity learning, etc.

As a non-limiting example, when the user moves handheld electronic device 210 forward and performs the motion-based gestures 560 and 580 or 590, the rule based operations can process the measured electromagnetic-field of the user and determine that the user is pointing handheld electronic device 210 forward and performed the motion-based gestures 560 and 580 or 590 based on the measured change in strength the electromagnetic-field of the user. Another non-limiting example of rule-based processing is to determine that the user has extended their arm toward the second device when performing motion-based gesture 580 based on processing acceleration and/or rotation of handheld electronic device 210. Motion-based gesture 580 can involve measuring linear motion of handheld electronic device 210, acceleration of handheld electronic device 210, and lack of rotation of the arm of the user. Motion-based gesture 580 can alternatively or additionally include only a rotation of the shoulder of the user.

Figure 6:
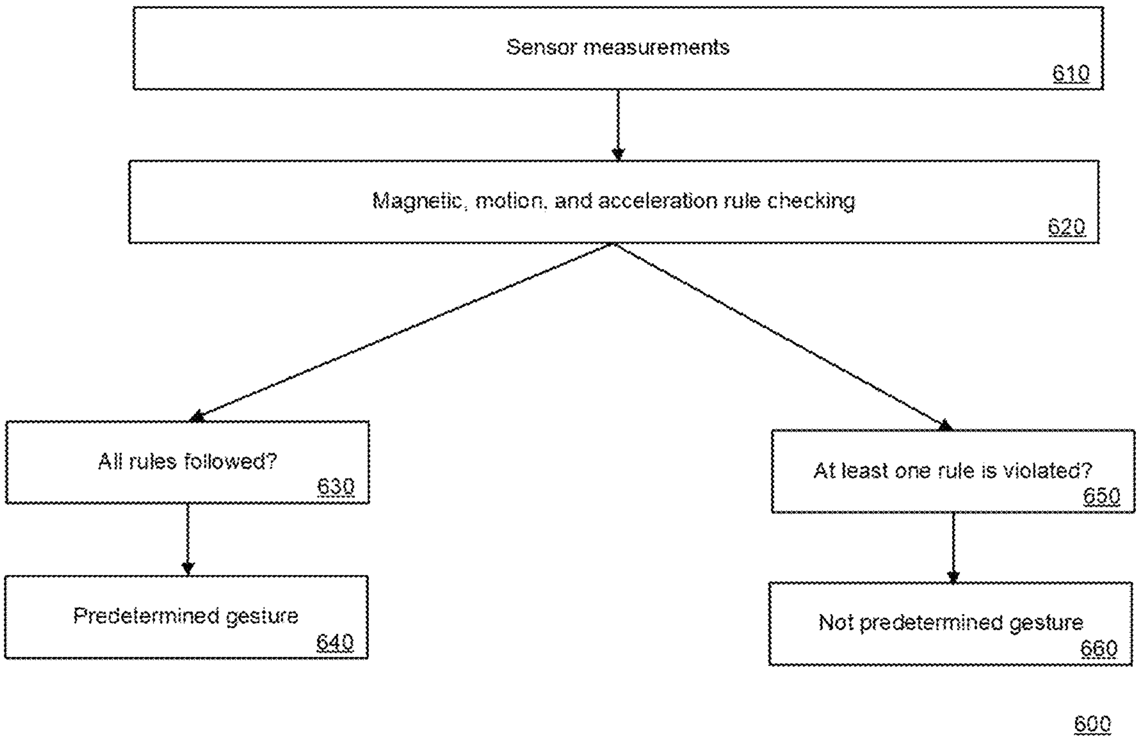
FIG. 6 illustrates a rule based pointing gesture recognition operation, according to an embodiment of the present disclosure.

A non-limiting example embodiment of a gesture recognition method 600 performed by the PRGS 200 of handheld electronic device 210 is illustrated in FIG. 6. Gesture recognition method 600 begins at operation 610. During movement of handheld electronic device 210, one or more movement sensors of the handheld electronic device 210 generate signals based on the motion of the handheld electronic device 210. The one or more movement sensors can include an accelerometer, a gyroscope, a magnetometer, and a barometer. At operation 610, sensor measurements are determined based on the signals received from the one or more movement sensors of handheld electronic device 210. Determining the sensor measurements can include receiving the signals, initial interpretation as numerical values, initial filtering, or the like, or a combination thereof. The method 600 then proceeds to operation 620.

At operation 620, rules checking, such as magnetic, motion and acceleration rule checking operations are performed. The magnetic rule checking operation can process the signals generated by the magnetometer. The motion rule checking operation can process the signals generated by the accelerometer, or other sensors indicative of motion. The acceleration rule checking operation can also process the signals generated by the accelerometer. Checking of rules includes processing the sensor measurements to determine if they are indicative of a predetermined motion-based gesture. This can include checking whether a rule is satisfied, where the rule checks (tests) whether the sensor measurements exhibit predetermined characteristics that indicate the predetermined motion-based gesture has been recognized. If all rules are followed (satisfied) 630 then the PGRS 200 recognizes that the motion-based gesture performed by a user holding the handheld electronic device 201 (or wearing the handheld electronic device 210) is the predetermined motion-based gesture. In other words, the PGRS 200 determines that the handheld electronic device 210 is being used 640 in a pointing operation. Alternatively, if at least one rule is violated 650 then PGRS 200 determines that the predetermined motion-based gesture has not been recognized and the handheld electronic device 210 is not being used 660 in the pointing operation.

Figure 7:
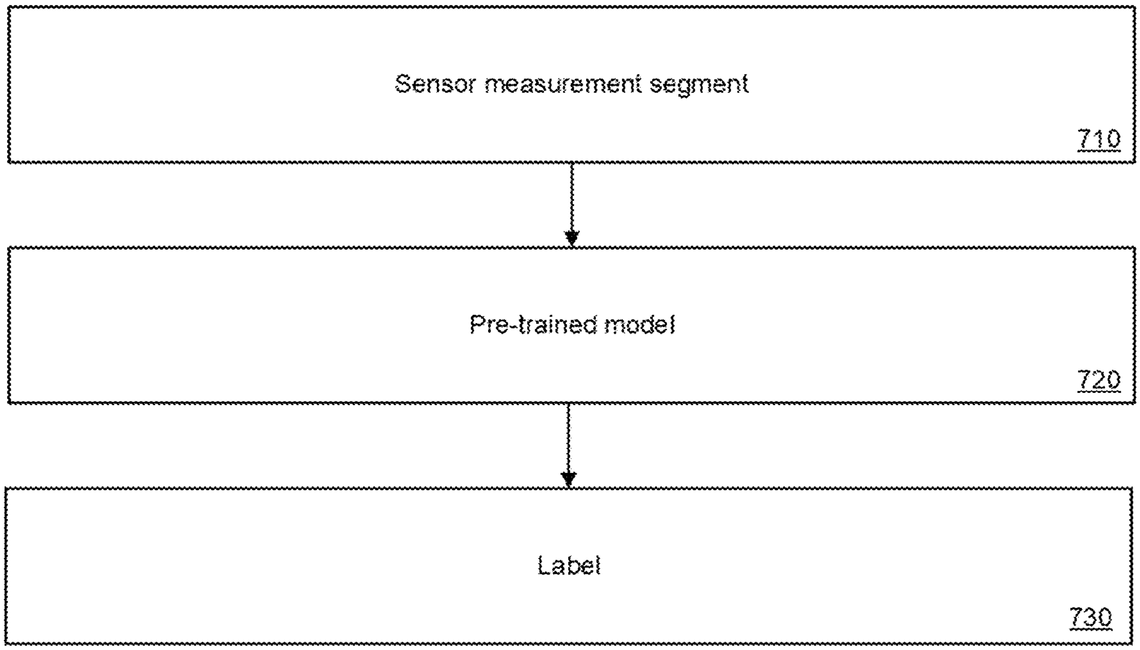
FIG. 7 illustrates a learning based pointing gesture recognition operation, according to an embodiment of the present disclosure.

Another non-limiting example embodiment of a gesture recognition method 700 performed by the PRGS 200 of handheld electronic device 210 is illustrated in FIG. 7. In this example embodiment, one or more movement sensors of the handheld electronic device 210 generate signals when a user performs a motion-based gesture by moving the holding handheld electronic device 210 as shown in FIG. 5. The signals generated by these movement sensors are then received at 720 by a pre-trained model that is configured to infer a probability for each type of motion-based gesture in a set of motion-based gestures recognized by the pre-trained model based on the received signals. The one or more movement sensors can include an accelerometer, a gyroscope, a magnetometer, and a barometer. The pre-trained model can be implemented by a SVM, CNN, and LSTM. The pre-trained model 720 outputs an identifier (i.e. a label) of the type of motion-based gesture that has a highest probability in the set of motion-based gestures as the recognized motion-based gesture. PGRS 200 then determines whether the label of the recognized motion-based gesture corresponds to the predetermined motion-based gesture.

Learning-based processing can be used to analyze a user pointing handheld electronic device 210 forward during a motion-based gesture. Such learning-based processing can include classification based and similarity based processing methods. Classification based processing methods can include generating a binary label indicating that the user is pointing handheld electronic device 210 forward when performing a motion-based gesture. Classification based processing methods can performed using a SVM, a CNN, or a LSTM. Similarity based processing methods can include use of a pre-built pointing gesture sensor measurement template.

Figure 8:
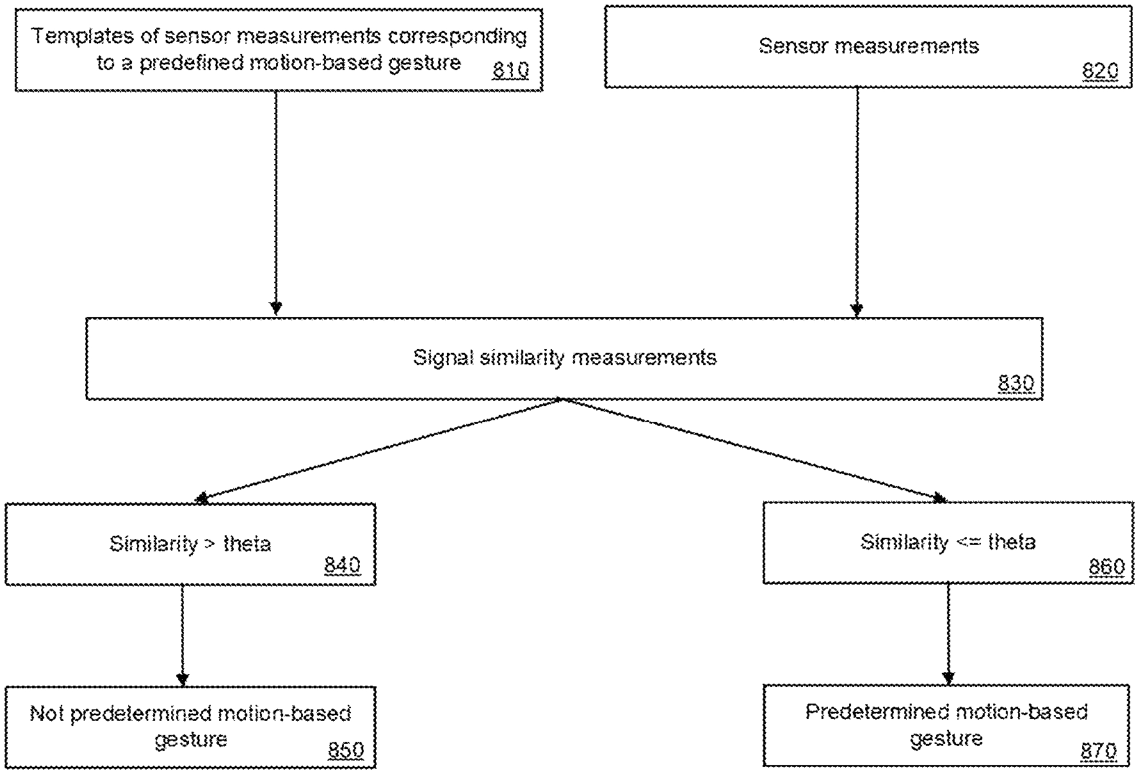
FIG. 8 illustrates a learning based similarity pointing gesture recognition operation, according to an embodiment of the present disclosure.

Another non-limiting example embodiment of a gesture recognition method 800 performed by the PRGS 200 of handheld electronic device 210 is illustrated in FIG. 8. The gesture recognition method begins at operation 810 where templates of sensor measurements that correspond to a predefined motion-based gesture are received 810.

In some embodiments, recognizing that the motion-based gesture is the predetermined motion-based gesture includes processing the signals generated by the one or more movement sensors using a mannequin model. One or more movement sensors of the handheld electronic device 210 generate signals based on the motion of the handheld electronic device 210 when a pointing gesture is performed by a user holding the handheld electronic device 210. At operation 820, signals received from the one or more movement sensors are processed to generate sensor measurements 820 for the one or more movement sensor. At operation 830, signal similarity processing 830 is performed using the templates received at operation 810 and using sensor measurements generated at 820. At operation 840, the PGRS 200 determines that the similarity is greater than threshold theta. At operation 850, the PGRS 200 determines that sensor measurements does not correspond to the predetermined motion-based gesture. At operation 860, the PGRS 200 determines that the similarity is less than or equal to the threshold theta 860 and proceeds to operation 870 where the PGRS 200 determines that sensor measurements correspond to the predetermined motion-based gesture.

In some embodiments, identifying the second device is performed after determining that the sensed motion of the handheld electronic device 210 has ceased.

In some embodiments, initiating the user interaction comprises launching an application on the handheld electronic device 210 for interacting with the second device.

In some embodiments, the method also comprises, after launching the application sensing further motion of the handheld v based on further signals generated by the one or more movement sensors.

In some embodiments, the method also comprises recognizing that the sensed further motion is a predetermined de-selection motion-based gesture comprising movement of the electronic device 210 and for ceasing interaction with the second device.

In some embodiments, the method also comprises, after recognizing that the sensed further motion is the predetermined de-selection motion-based gesture, closing the application. A non-limiting example of the de-selection motion-based gesture, from FIG. 5, is the reverse motion of previously described gesture 590. The reverse motion of gesture 590 that can be a de-selection motion-based gesture can be the movement of handheld electronic device 210 from position 570 to position 540. As a non-limiting example, sensing de-selection motion-based gesture of reverse gesture 590 can be recognized by a radio-frequency movement sensor detecting an increase in electromagnetic field strength of the user as the proximity of handheld electronic device 210 increased.

In some embodiments, the one or more movement sensors comprise one or more of: an accelerometer, a magnetometer, a proximity sensor, a gyroscope, an ambient light sensor, a camera, a microphone, a radiofrequency receiver; a near-field communication device; and a temperature sensor.

Figure 9:
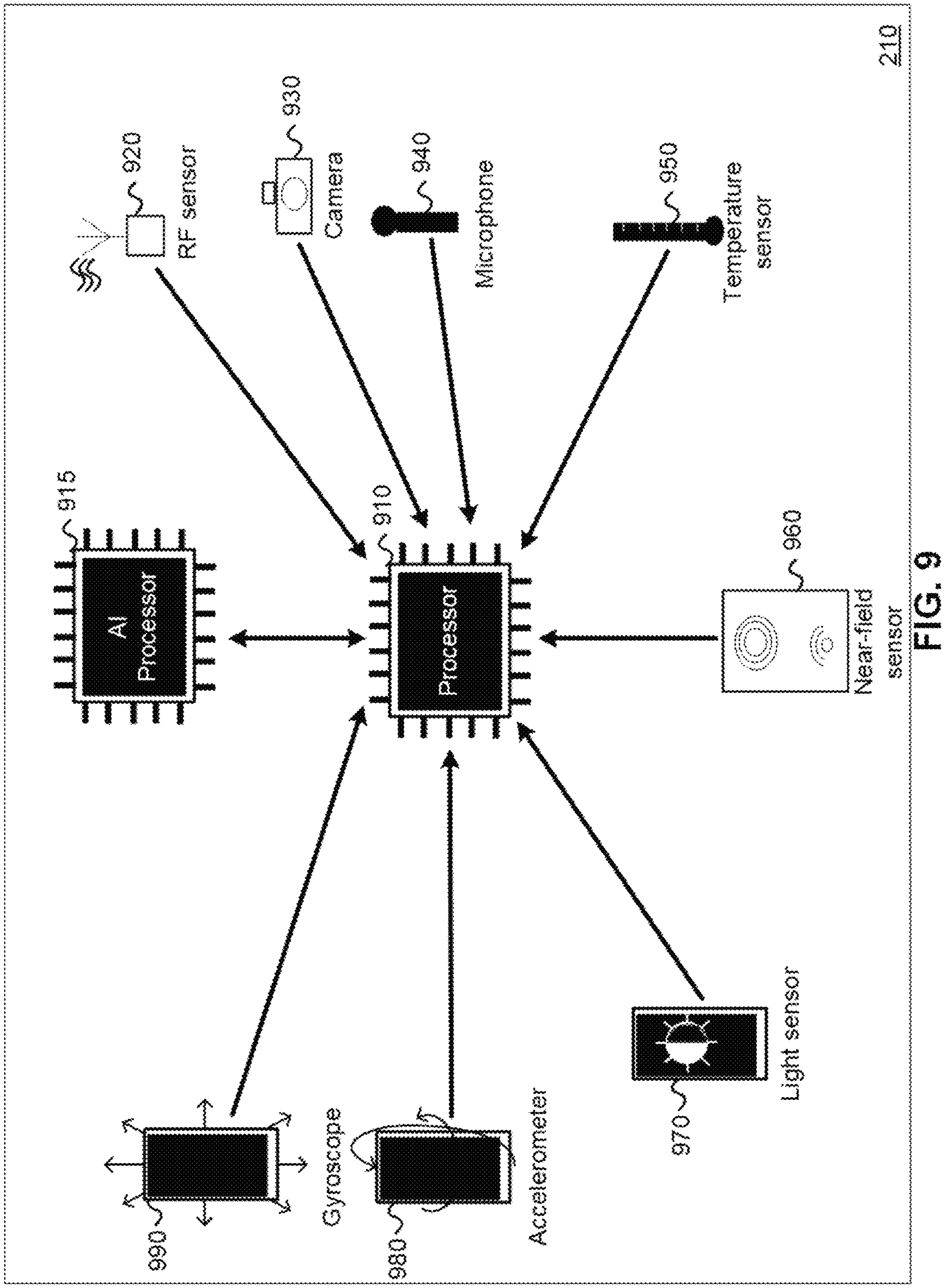
FIG. 9 illustrates sensors that can be included in a handheld device, according to an embodiment of the present disclosure.

FIG. 9 illustrates several motion sensors that can be included in handheld electronic device 210 to generate signals corresponding to the motion-based gestures of a user as the user moves handheld electronic device 210. Processor 910 of handheld electronic device 210 processes predetermined conditions generated by radio-frequency (RF) sensor 920, camera 930, microphone 940, temperature sensor 950, near-field sensor 960, light sensor 970, accelerometer 980, and gyroscope 990. Processor 910 may require processing signals generated by a plurality of these components in order to determine the predefined gesture. Alternatively processor 910 may require processing signals generated by a single movement sensor to determine the motion-based gesture. Various sensors can be used where such sensors output signals which are in direct response to, or correlate with, motion. Accelerometers respond to motion-based acceleration. Gyroscopes and magnetometers respond to motion because they respond to changes in orientation. Magnetometers also respond to motion that brings them toward or away from a magnetic field, such as that of a human body. Other sensors respond to changes in conditions that can be the result of motion. Potentially, signals from multiple sensors can be used to detect a predetermined motion-based gesture, by processing these signals to identify particular value ranges, signatures, waveforms, combinations of waveforms, or the like, which typically result from the predetermined motion-based gesture being performed.

In some embodiments, the one or more movement sensors are configured to detect one or more of: displacement motion; rotational motion; and proximity to a user.

A non-limiting example of determining displacement motion is to determine displacement based on the predetermined condition generated by accelerometer 980 of handheld electronic device 210. The signal generated by accelerometer 980 can correspond to the acceleration and/or de-acceleration of handheld electronic device 210 as the user moves it according to the motion-based gesture. It should be appreciated that the displacement motion can include sensing the proximity of handheld electronic device 210 to the body of the user by accelerometer 980.

A non-limiting example of rotational motion of handheld electronic device 210 can be determined using gyroscope 990 of handheld electronic device 210. As the user moves handheld electronic device 210 according to the motion-based gesture, gyroscope 990 can generate a signal corresponding to the rotation of handheld electronic device 210.

A non-limiting example of determining proximity of handheld device 210 to the body of a user is to detect the strength of the electromagnetic field generated by the user's body using RF detector 920. Electromagnetic field strength can be indicative of the proximity of handheld electronic device 210 to the body of the user, or to a radiofrequency source. For example, as handheld electronic device 210 is moved towards the body of the user, RF detector 920 can detect a progressively stronger electromagnetic field of the user. As a further example, as handheld electronic device 210 is moved away from the body of the user, RF detector 920 can detect a progressively weaker electromagnetic field of the user.

According to some embodiments, the handheld electronic device 210 can include (for example in addition to the processor 910 of FIG. 9), an artificial intelligence (AI) processor 915. The AI processor may comprise one or more of: a graphics processing unit (GPU); a tensor processing unit (TPU); a field programmable gate array (FPGA); and an application specific integrated circuit (ASIC). The AI processor may be configured to perform computations of a machine-learning model (i.e. the machine learning operations). The model itself may be deployed and stored in the memory of the handheld electronic device.

In some embodiments, the one or more other components of the handheld device comprise one or more of: a magnetometer, a proximity sensor, a camera, a microphone, a radiofrequency receiver; and a near-field communication device.

In some embodiments, the one or more other components of the handheld device are configured to detect location of one or more other electronic devices including the second device.

In some embodiments, the one or more other components of the handheld device are configured to detect location of said one or more other electronic devices based at least in part on an angle of arrival measurement of signals emitted by each of said one or more other electronic devices.

In some embodiments, the method further includes, after the predetermined condition is met and the second device is identified, displaying an icon indicative of the second device on a display of the handheld electronic device, and varying position the icon on the display according to one or both of: an angle between a pointing direction of the handheld electronic device and a direction of the second device relative to the handheld electronic device; and a measurement of likelihood that the handheld device is being pointed toward the second device.

In some embodiments a handheld electronic device comprises one or more movement sensors configured to generate signals indicative of motion of the handheld device.

In some embodiments the handheld electronic device further includes processing electronics configured to sense motion of the handheld device based on the signals generated by the one or more movement sensors. The device is further configured to recognize that the sensed motion is a motion-based gesture comprising movement of the handheld electronic device. The device is further configured to identify the second device based on further signals from: the one or more movement sensors; one or more other components of the handheld device; or a combination thereof. The further signals indicative of a direction in which the handheld electronic device is pointing at an end of the motion-based gesture. The device is further configured, after a predetermined condition is met and the second device is identified, to initiate a user interaction for remotely interacting with the second device. The predetermined condition is at least partially met when the recognized motion-based gesture is a predetermined motion-based gesture for interacting with the second device.

It should be appreciated that the embodiments of the handheld electronic device can be configured to perform the method described herein.

Figure 10:
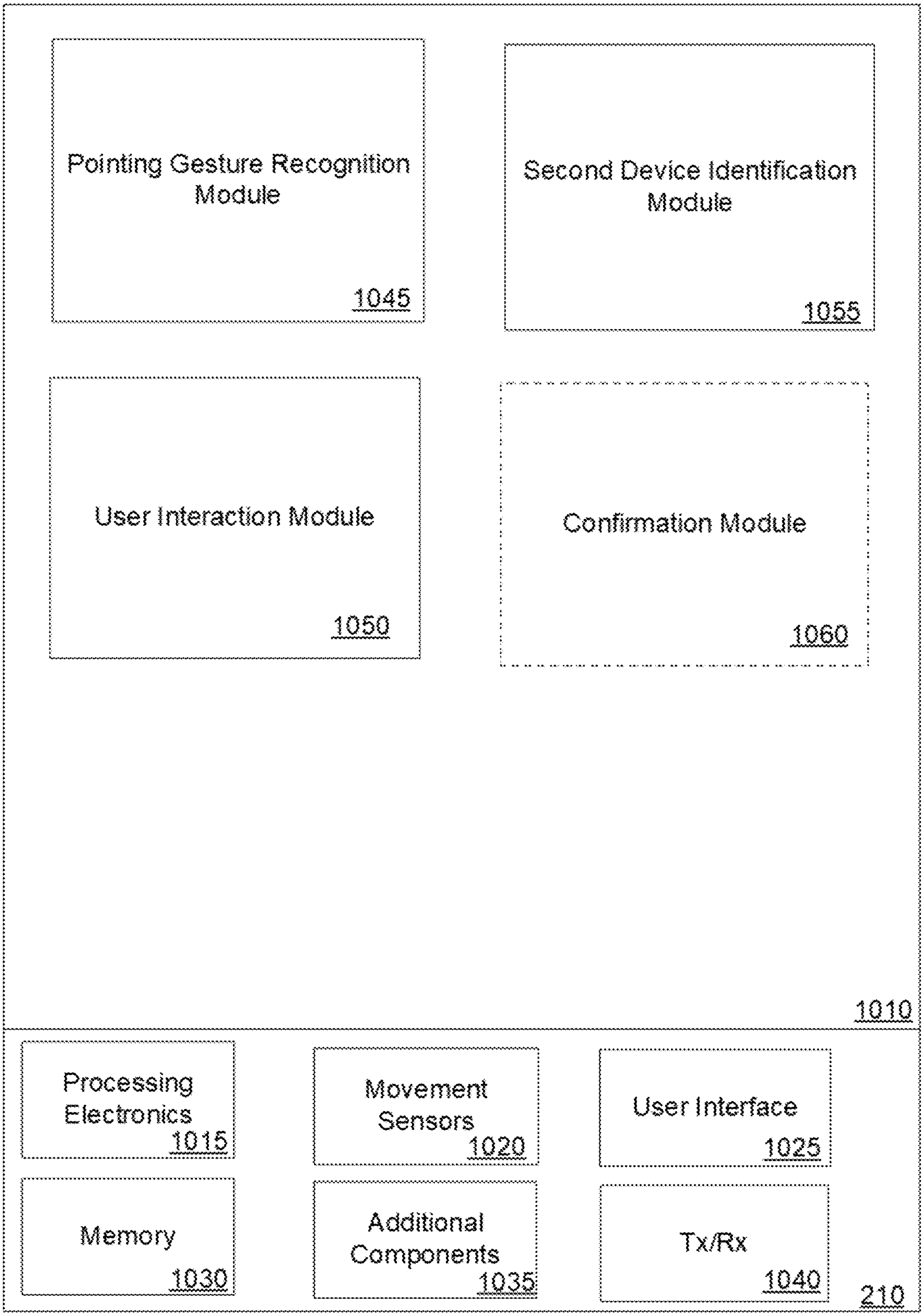
FIG. 10 illustrates a handheld electronic device according to an embodiment of the present disclosure.

FIG. 10 illustrates a non-limiting example of a handheld electronic device 210 with functional modules, which can be provided using components such as the processing electronics 1015. The processing electronics can include a computer processor executing program instructions stored in memory 1030. As discussed previously, the device 210 can include movement sensors 1020, additional components 1035, a user interface 1025, and a transmitter and receiver 1040. The user interface 1025 can be used to direct, by a user, interaction with a second device. The transmitter and receiver 1040 can be used to communicate with a second device and also, in some embodiments, to locate a second device for example using angle of arrival measurements and processing.

The device 210 as illustrated in FIG. 10 includes a pointing gesture recognition module 1045. The pointing gesture recognition module can perform the various operations of the PGRS as described elsewhere herein. The device 210 may include a second device identification module 1055, which is configured to identify a second device which the device 210 is pointing at, for example at termination of a predetermined gesture. The device 210 may include a user interaction module 1050, which may launch and execute an appropriate application for user-directed interaction with the second device. The device 210 may include a confirmation module 1060, which monitors for a confirmation input as described elsewhere herein, and which may also prompt the user for the confirmation input, for example by causing the device 210 to vibrate, emit a sound, or generate a prompt on a display of the device 210.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method, by a handheld electronic device, for remotely interacting with a second device, the method comprising:

sensing a movement trail of the handheld electronic device based on signals generated by one or more movement sensors of the handheld electronic device, by the handheld electronic device, during movements of the handheld electronic device;

recognizing, by the handheld electronic device, a pointing direction based on the sensed movement trail and a direction indication in which the handheld electronic device is pointing at an end of a gesture;

confirming, by the handheld electronic device, a predetermined condition is met when the recognized pointing direction corresponds to a predefined direction gesture and the movement trail matches a predefined acceleration pattern;

identifying, by the handheld electronic device, the second device from the plurality of potential devices after the predetermined condition is met and the predefined acceleration pattern is matched; and triggering, by the handheld electronic device, an initial interaction with the second device only after the predetermined condition is met, the predefined acceleration pattern is matched and the second device is identified.

2. The method of claim 1, wherein the predetermined condition further comprises recognizing a confirmation input from an user following a recognized motion-based gesture.

3. The method of claim 2, wherein recognizing the confirmation input comprises recognizing that a sensed motion further includes a second predetermined motion-based gesture comprising movement of the handheld electronic device, the second predetermined motion-based gesture following the predetermined motion-based gesture.

4. The method of claim 2, wherein recognizing the confirmation input comprises recognizing, using the one or more movement sensors, that the handheld electronic device is rotated in place.

5. The method of claim 2, wherein recognizing the confirmation input comprises recognizing, using the one or more movement sensors, that the handheld electronic device is held in position following said predetermined motion-based gesture without further motion for a predetermined amount of time.

6. The method of claim 2, wherein recognizing the confirmation input comprises detecting presence of a signal indicative of pressing of a physical button of the handheld electronic device or a virtual button displayed on a touchscreen of the handheld electronic device.

7. The method of claim 2, further comprising, after recognizing that the motion-based gesture is the predetermined motion-based gesture, after the second device is identified, and prior to detecting the confirmation input, prompting the user to provide the confirmation input to confirm an intention to interact with the second device.

8. The method of claim 1, wherein the predetermined condition further comprises detecting presence of a signal indicative of pressing of a physical button of the handheld electronic device or a virtual button displayed on a touchscreen of the handheld electronic device and the predetermined condition comprises detecting presence of the signal indicative of pressing of the physical button or the virtual button at a beginning of the motion-based gesture.

9. The method of claim 1, wherein recognizing that the pointing direction based on the sensed movement trail comprises recognizing signals, generated by the one or more movement sensors, indicative of movement of the handheld electronic device from a first position to a second position in an upward arcing motion, wherein the first position corresponds to the handheld electronic device being proximate to a hip of the user and pointing downward, and the second position corresponds to the handheld electronic device being held at the end of a straightened arm and pointing toward the second device.

10. A non-transitory computer-readable medium comprising instructions which, when executed by a processor of a handheld electronic device cause the handheld electronic device to perform the method of claim 1.

11. The method of claim 1 further comprising, after the predetermined condition is met and the second device is identified, displaying an icon indicative of the second device on a display of the handheld electronic device, and varying position of the icon on the display according to one or both of: an angle between a pointing direction of the handheld electronic device and a direction of the second device relative to the handheld electronic device; and a measurement of likelihood that the handheld device is being pointed toward the second device.

12. The method of claim 1 further comprising detecting the direction in which the handheld electronic device is pointing by adjusting the angle of arrival by an offset angle, the offset angle being an angle between a first ray from the handheld electronic device to a center of the second device and a second ray from the handheld electronic device to a location of the second device other than a center of the second device and at which the directional wireless signal is transmitted or received.

13. A handheld electronic device, comprising:

one or more movement sensors configured to generate signals indicative of motion of the handheld electronic device; and processing electronics configured to:

sense a movement trail of the handheld electronic device based on the signals generated by the one or more movement sensors during movements of the handheld electronic device;

recognize a pointing direction based on the sensed movement trail and a direction indication in which the handheld electronic device is pointing at an end of a gesture;

confirm a predetermined condition is met when the recognized pointing direction corresponds to a predefined direction gesture and the movement trail matches a predefined acceleration pattern identify the second device from the plurality of potential devices after the predetermined condition is met and the predefined acceleration pattern is matched; and trigger an initial interaction with the second device only after the predetermined condition is met, the predefined acceleration pattern is matched and the second device is identified.

14. The handheld electronic device of claim 13, wherein the predetermined condition further comprises recognizing a confirmation input from an user following a recognized motion-based gesture.

15. The handheld electronic device of claim 14, wherein recognizing the confirmation input comprises recognizing that a sensed motion further includes a second predetermined motion-based gesture comprising movement of the handheld electronic device, the second predetermined motion-based gesture following the predetermined motion-based gesture.

16. The handheld electronic device of claim 14, wherein recognizing the confirmation input comprises recognizing, using the one or more movement sensors and the processing electronics, that the handheld electronic device is rotated in place.

17. The handheld electronic device of claim 14, wherein recognizing the confirmation input comprises recognizing, using the one or more movement sensors and the processing electronics, that the handheld electronic device is held in position following said predetermined motion-based gesture without further motion for a predetermined amount of time.

18. The handheld electronic device of claim 14, wherein recognizing the confirmation input comprises detecting, using the processing electronics, presence of a signal indicative of pressing of a physical button of the handheld electronic device or a virtual button displayed on a touchscreen of the handheld electronic device.

19. The handheld electronic device of claim 14, further configured, after recognizing that the motion-based gesture is the predetermined motion-based gesture, after the second device is identified, and prior to detecting the confirmation input, to prompt the user to provide the confirmation input to confirm an intention to interact with the second device.

20. The handheld electronic device of claim 13, wherein the predetermined condition further comprises detecting presence of a signal indicative of pressing of a physical button of the handheld electronic device or a virtual button displayed on a touchscreen of the handheld electronic device.

21. The handheld electronic device of claim 20, wherein the predetermined condition comprises detecting presence of the signal indicative of pressing of the physical button or the virtual button at a beginning of the motion-based gesture.

22. The handheld electronic device of claim 13 further comprising a pointing gesture recognition system for detecting the direction in which the handheld electronic device is pointing by adjusting the angle of arrival by an offset angle, the offset angle being an angle between a first ray from the handheld electronic device to a center of the second device and a second ray from the handheld electronic device to a location of the second device other than a center of the second device and at which the directional wireless signal is transmitted or received.

* * * * *